US007085699B2

(12) United States Patent
Variyam

(10) Patent No.: US 7,085,699 B2
(45) Date of Patent: Aug. 1, 2006

(54) WIRE BONDING SIMULATION

(75) Inventor: Manjula N. Variyam, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 383 days.

(21) Appl. No.: 10/745,358

(22) Filed: Dec. 23, 2003

(65) Prior Publication Data

US 2005/0133566 A1 Jun. 23, 2005

(51) Int. Cl.
*G06F 17/50* (2006.01)
(52) U.S. Cl. ............... 703/13; 716/15; 228/110.1
(58) Field of Classification Search ............ 716/1, 716/12, 15; 703/13; 228/110.1
See application file for complete search history.

(56) References Cited

U.S. PATENT DOCUMENTS

| | | | |
|---|---|---|---|
| 4,998,002 A | 3/1991 | Okikawa et al. | |
| 5,226,582 A | 7/1993 | Kubota et al. | |
| 6,178,540 B1 | 1/2001 | Lo et al. | |
| 6,396,142 B1 | 5/2002 | Ito et al. | |
| 6,786,392 B1* | 9/2004 | Nogawa | 228/180.5 |
| 2003/0080176 A1* | 5/2003 | Mayer et al. | 228/102 |
| 2003/0115568 A1* | 6/2003 | Miller et al. | 716/15 |
| 2003/0218050 A1* | 11/2003 | Kanemoto et al. | 228/103 |
| 2005/0125747 A1* | 6/2005 | Nelson et al. | 716/1 |
| 2005/0194423 A1* | 9/2005 | Okita | 228/110.1 |
| 2005/0284916 A1* | 12/2005 | Ishikawa | 228/110.1 |

OTHER PUBLICATIONS

Krzanowski, J. E., "A Transmission Electron Microscopy Study of Ultrasonic Wire Bonding," IEEE Transactions on Components, Hybrids, and Manufacturing Technology, vol. 13, No. 1 (Mar. 1990) pp. 176-181.
Takahashi, Y., "Numercial Analysis of Interfacial Contact Process in Wire Thermocompression Bonding," IEEE Transactions on Components, Hybrids, and Manufacturing Technology, Part A, vol. 19, No. 2 (Jun. 1996) pp. 213-223.

\* cited by examiner

*Primary Examiner*—Stacy A. Whitmore
(74) *Attorney, Agent, or Firm*—Yingsheng Tung; Wade James Brady, III.; Frederick J. Telecky, Jr.

(57) ABSTRACT

Embodiments of the present invention may provide ways and uses for correlating actual wire bonding machine adjustment parameters to inputs needed for FEA simulations in modeling actual wire bonding operations of a specified capillary design and wire bonding machine. Simulations of wire bonding operations using the specified capillary design are performed with a range of inputs (e.g., capillary displacement, wire yield strength) to develop empirical equations relating to the simulations. Actual wire bonding operations are performed using the specified capillary design with ranges of the actual wire bonding machine adjustment parameters, and the results provide empirical equations relating to the actual wire bonding machine adjustment parameters. The empirical equations are combined to provide empirical equations for the simulation inputs as functions of the actual wire bonding machine adjustment parameters. Such equations may aid in performing chip failure analysis and/or may be incorporated into design rules.

20 Claims, 5 Drawing Sheets

FA = FACE ANGLE
H = HOLE SIZE
CD = CHAMFER DIAMETER
T = TIP DIAMETER
CA = CHAMFER ANGLE
OR = OUTER RADIUS
$L_H$ = HOLE LENGTH
$A_1$ = INNER TAPER ANGLE
BNA = BOTTLE NECK ANGLE
FAB = FREE AIR BALL DIAMETER

WIRE BONDING SIMULATION

TECHNICAL FIELD

The present invention generally relates to the simulation of a wire bonding operation. In one aspect it relates more particularly to a method of correlating wire bonding machine adjustment parameters with finite element analysis inputs to provide operation simulation and failure analysis based on the wire bonding machine settings chosen.

BACKGROUND

Wire bonding processes have been simulated in the past, but most simulations have been theoretical studies with little practical applications. For example, a wire bonding operation may be simulated using finite element analysis (FEA) software (e.g., ANSYS®, ALGOR®). Results from an FEA may be useful in performing failure analysis of a wire bond and/or failure analysis of a chip receiving the wire bond, for example.

For some FEA software, the inputs are capillary design (e.g., geometry, material properties), capillary displacement, and wire properties (e.g., wire diameter, initial free air ball size, yield strength), for example. However, such inputs are not very practical because the actual inputs, settings, and/or adjustments found on a typical wire bonding machine are often much different. Some example parameters set or adjusted on a typical wire bonding machine by an operator include ultrasonic energy, ultrasonic current, scrub time, and capillary force, for example.

Because the wire bonding machine adjustment parameters generally do not match up with the input parameters needed by most FEA software, failure analysis on a chip being wire bonded is often performed by trial and testing of actual chips. This can be rather costly and time consuming. Often it would be more desirable to perform the failure analysis using FEA simulations. Also, incorporating wire bonding process information into the design rules for chip layout so that the chip may be designed according to such rules would be preferred in most cases, rather than performing trial and error testing. It would thus be desirable to provide a more practical application of a wire bonding simulation. Hence, a need exists for a way to estimate (through simulation) stresses exerted on a chip during a wire bonding process using the wire bonding machine adjustment parameters as inputs.

SUMMARY OF THE INVENTION

The problems and needs outlined above may be addressed by embodiments of the present invention. In accordance with one aspect of the present invention, a method of analyzing wire bonding operations for a specified capillary design of a wire bonding machine, is provided. This method includes the following steps described in this paragraph, and the order of steps may vary. Multiple finite element analysis simulations are performed, which model an actual wire bonding operation of the specified capillary design with a range of simulation inputs. Empirical equations relating to the inputs simulations are developed based on simulation outputs from the multiple finite element analysis simulations. Multiple actual wire bonding operations are performed using the specified capillary design over ranges of actual wire bonding machine adjustment parameters. Empirical equations relating to the actual wire bonding machine adjustment parameters are developed based on a study of results of the multiple actual wire bonding operations. The empirical equations are combined to provide correlated empirical equations for the simulation inputs as functions of at least some of the actual wire bonding machine adjustment parameters.

In accordance with another aspect of the present invention, a method of correlating actual wire bonding machine adjustment parameters to inputs needed for simulating wire bonding operations for a specified capillary design of a wire bonding machine, is provided. This method includes the following steps described in this paragraph, and the order of steps may vary. Multiple finite element analysis simulations of wire bonding operations are performed using a model of the specified capillary design for the wire bonding machine and iterating through various combinations of a first set of simulation inputs. Empirical equations for simulation capillary displacement and simulation yield strength are obtained based on results of the simulations. The simulation results include simulation-final-ball shape data. The empirical equation for simulation capillary displacement is a function of simulation-final-ball shape. The empirical equation for simulation yield strength is a function of simulation capillary displacement. Multiple actual wire bonding operations are performed using the specified capillary design and the wire bonding machine and iterating through various combinations of at least some of the actual wire bonding machine adjustment parameters. An empirical equation for actual-final-ball shape is obtained based on results of the actual wire bonding operations. The empirical equation for actual-final-ball shape is a function of at least one of the actual wire bonding machine adjustment parameters. The empirical equation for actual-final-ball shape is input into the empirical equation for simulation capillary displacement to obtain a correlated empirical equation for simulation capillary displacement as a function of at least one of the actual wire bonding machine adjustment parameters. The correlated empirical equation for simulation capillary displacement is input into the empirical equation for simulation yield strength to obtain a correlated empirical equation for simulation yield strength as a function of at least one of the actual wire bonding machine adjustment parameters.

In accordance with yet another aspect of the present invention, a method of modeling a wire bonding process for a wire bonding machine, is provided. This method includes the following steps described in this paragraph, and the order of steps may vary. A first set of simulations with a first set of input data for a specified design of a capillary for the wire bonding machine is performed using a finite element analysis of the wire bonding machine in simulated operation, wherein the first set of input data comprises at least one simulation capillary displacement value, at least one simulation wire material yield strength value, and at least one simulation-initial-free-air-ball size value. From the first set of simulations, a first set of output data is obtained. The first set of output data includes at least one simulation-final-ball shape value and at least one simulation force value. Simulation force corresponds to a reaction force on the capillary. At least one parameter of the first set of input data is plotted versus at least one parameter of the first set of output data, and a curve fit is imposed on the plot provided. An equation for simulation capillary displacement as a function of simulation-final-ball shape and simulation-initial-free-air-ball size is obtained based on the curve fitting of at least one parameter of the first set of input data versus at least one parameter of the first set of output data. An equation for simulation yield strength as a function of simulation capillary displacement, simulation force, and simulation-initialfree-air-ball size is obtained based on the curve fitting of at least one parameter of the first set of input data versus at least one parameter of the first set of output data. A first set of actual wire bonds is performed using the wire bonding machine, the specified capillary design, and a first set of wire bonding machine adjustment parameters. The first set of wire bonding machine adjustment parameters includes at least one actual-initial-free-air-ball size value, at least one actual capillary force value, and at least one machine-specific parameter value. From the first set of actual wire bonds, a set of actual-final-ball shape data is obtained. At least one parameter of the first set of wire bonding machine adjustment parameters is plotted versus at least part of the actual-final-ball shape data, and a curve fit is imposed on the plot provided. An equation for actual-final-ball shape is obtained as a function of the at least one parameter of the first set of wire bonding machine adjustment parameters. The actual-final-ball shape equation is input into the simulation capillary displacement equation to obtain a correlated capillary displacement equation as a function of the at least one parameter of the first set of wire bonding machine adjustment parameters, such that a correlated capillary displacement value may be calculated from the correlated capillary displacement equation using the at least one parameter of the first set of wire bonding machine adjustment parameters. The correlated capillary displacement equation is input into the simulation yield strength equation to obtain a correlated yield strength equation as a function of the at least one parameter of the first set of wire bonding machine adjustment parameters, such that a correlated yield strength value may be calculated from the correlated yield strength equation using the at least one parameter of the first set of wire bonding machine adjustment parameters.

In accordance with still another aspect of the present invention, a method of performing a failure analysis on a chip, is provided. This method includes the following steps described in this paragraph, and the order of steps may vary. Multiple finite element analysis simulations of wire bonding operations are performed using a model of the specified capillary design for the wire bonding machine and iterating through various combinations of a first set of simulation inputs. Empirical equations for simulation capillary displacement and simulation yield strength are obtained based on results of the simulations. The results include simulation-final-ball shape data. The empirical equation for simulation capillary displacement is a function of simulation-final-ball shape. The empirical equation for simulation yield strength is a function of simulation capillary displacement. Multiple actual wire bonding operations are performed by using the specified capillary design and the wire bonding machine, and by iterating through various combinations of at least some of the actual wire bonding machine adjustment parameters. An empirical equation for actual-final-ball shape is obtained based on results of the actual wire bonding operations. The empirical equation for actual-final-ball shape is a function of at least one of the actual wire bonding machine adjustment parameters. The empirical equation for actual-final-ball shape is input into the empirical equation for simulation capillary displacement to obtain a correlated empirical equation for simulation capillary displacement as a function of at least one of the actual wire bonding machine adjustment parameters. The correlated empirical equation for simulation capillary displacement is input into the empirical equation for simulation yield strength to obtain a correlated empirical equation for simulation yield strength as a function of at least one of the actual wire bonding machine adjustment parameters. An analysis input data set is selected from the actual wire bonding machine adjustment parameters. The analysis input data set is input into the correlated empirical equation for simulation capillary displacement to obtain an analysis value for simulation capillary displacement. The analysis input data set is input into the correlated empirical equation for simulation yield strength to obtain an analysis value for simulation yield strength. Design specifications for at least part of a chip are input, as well. A finite element analysis simulation of a wire bonding operation is performed using a model of the specified capillary design for the wire bonding machine. The simulated effect of the simulated wire bonding operation on the chip is analyzed.

The foregoing has outlined rather broadly features of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The following is a brief description of the drawings, which illustrate exemplary embodiments of the present invention and in which.

DETAILED DESCRIPTION OF ILLUSTRATIVE EMBODIMENTS

Figure 1:
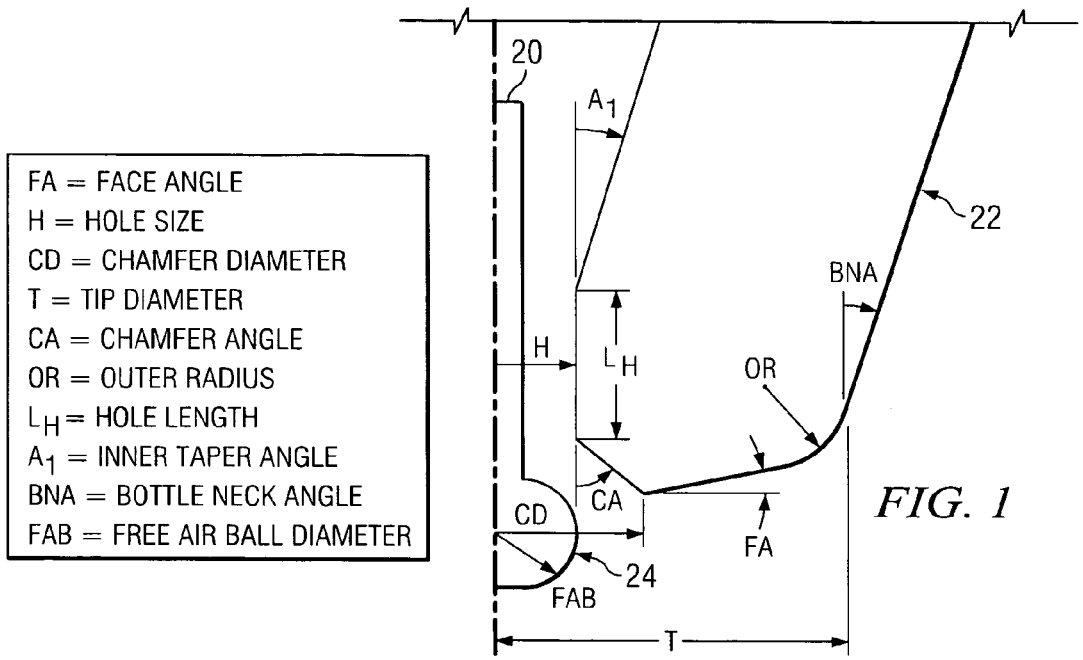
FIG. 1 shows a schematic of a ball-tipped wire and a capillary of a wire bonding machine.

Referring now to the drawings, wherein like reference numbers are used herein to designate like or similar elements throughout the various views, illustrative embodiments of the present invention are shown and described. One of ordinary skill in the art will appreciate the many possible applications and variations of the present invention based on the following illustrative embodiments of the present invention.

One of the advantages of an illustrative embodiment of the present invention is providing a way of correlating actual wire bonding machine adjustment parameters with input parameters needed for a typical FEA software program. Generally, one of the assumptions for providing such a correlation between actual wire bonding machine adjustment parameters and FEA simulation inputs is that varying the ultrasonic energy used by a wire bonding machine changes the yield strength of gold.

Gold or some gold alloy is often used for the wire material in a wire bonding process. Ultrasonic energy is often used in wire bonding processes because the ultrasonic energy aids in softening the gold wire and breaking up hard oxides that may be on a bond pad surface in order to facilitate metalto-metal bonding. Studies have shown that the yield strength of gold varies in relation to the ultrasonic energy used. For example, one study showed that gold undergoes recrystallization during ultrasonic scrubbing on a bond pad. See e.g., *A Transmission Electron Microscopy Study of Ultrasonic Wire Bonding*, J. E. Krzanowski, IEEE Transactions on Components, Hybrids, and Manufacturing Technology, Vol. 13, No. 1, March 1990, which is incorporated herein by reference. Usually, there is also a change in temperature associated with friction heating of the bond pad by the gold ball during ultrasonic scrubbing, but this temperature change is typically less than about 100° C. The frequency of ultrasonic vibration often ranges between about 60 kHz and about 120 kHz, for example. A downward force is usually applied to the clamping tool and/or capillary to ensure that the ultrasonic energy is imparted to the gold.

FIG. 1 shows a schematic with labeled dimensions of a ball-tipped wire 20 and a capillary 22 of a wire bonding machine, which may be used in a two-dimensional axisymmetric finite element model for FEA. In such a model, the material properties and other assumptions likely would be included as well. For example, the yield strength of the wire material ($\psi$) and the initial-free-air-ball size ($\Phi_o$) of the wire tip 24 are typical inputs to this type of FEA simulation. In the FEA simulation, the material of the wire 20 and the bond pad may be assumed to have bilinear kinematic stress-strain behavior, and other materials may be modeled as linear elastic, for example. The capillary 22 may be assumed to be a rigid body with infinite stiffness for the FEA simulation because the capillary stresses and strains are typically not of concern for this type of study.

Figure 2:
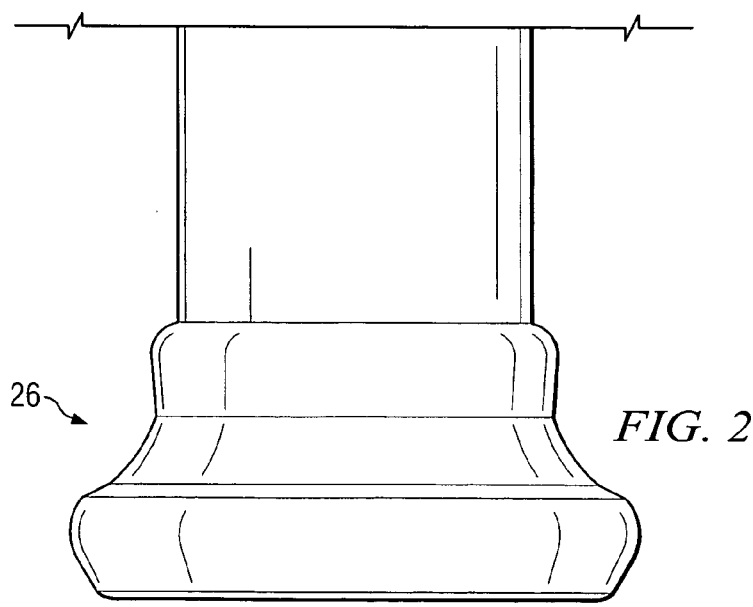
FIG. 2 shows a partially-squashed-ball wire tip image from an example FEA simulation.

During the FEA simulation, the capillary 22 is given a certain downward displacement ($\delta$). Such displacement pushes the capillary 22 against the ball-shaped tip 24 of the wire 20, which presses the ball-shaped wire tip 24 against a bond pad surface (on the chip). In this simulated process, the ball-shaped tip 24 is partially squashed, as when a metal-to-metal bond is formed between the wire tip 24 and the bond pad surface in an actual wire bonding process. FIG. 2 shows a partially-squashed-ball wire tip 26 image from an example FEA simulation. As the wire material comes into contact with the bond pad surface, contacting portions bond and continued ultrasonic forces and capillary displacement forces exert a shearing force on the pad due to the pulling effect of surrounding wire material elements.

Gold is a commonly used material for the wire 20 in wire bonding. In a response surface study for understanding the behavior of the ball (of the wire tip 24) under the action of the capillary 22 and gold yield strength (assuming the wire 20 is gold or partly gold), it was found that the final shape of the partially squashed gold ball 26 (see e.g., FIG. 2) depends on: capillary design (e.g., shape, type) (see e.g., FIG. 1), capillary displacement ($\delta$), and initial-free-air-ball size ($\Phi_o$). The study also showed that the partially squashed ball shape was substantially unaffected by the yield strength of gold. In general, it was found that the ball is squashed more for a higher capillary displacement ($\delta$) than for a smaller displacement. It was also found that generally when the initial-free-air-ball size ($\Phi_o$) is larger, for a given capillary displacement ($\delta$), the ball is squashed less than for a smaller ball size. For a given initial-free-air-ball size ($\Phi_o$), the final height (h) and diameter ($\Phi$) of the partially squashed ball are related through the conservation of volume. For example, for the capillary design of FIG. 1 studied in a test case, this relationship was empirically found to be: $\Phi - \Phi_o = 0.05(\Phi_o - h)^2 - (\Phi_o - h) + 5$, where $\Phi_o$ is the initial-free-air-ball size, h is the height of the final partially-squashed ball, and $\Phi$ is the final partially-squashed ball diameter. Note that this empirical relationship holds for this particular study, with a particular capillary design, and for the range of input variables used. For other capillary designs and other input ranges, the empirical relationship may vary. In general, however, this relationship may be described by: $\Phi = f_1(\Phi_o, h)$. Also, the capillary displacement ($\delta$) may be related to the final partially-squashed ball shape ($\Phi$) and the initial-free-air-ball size ($\Phi_o$) by the general relationship described by: $\delta = f_2(\Phi_o, \Phi)$.

From the study, it was also found that the reaction force (F) on the capillary 22 depended on wire yield strength ($\psi$), initial-free-air-ball diameter ($\Phi_o$), and capillary displacement ($\delta$). For a given initial-free-air-ball size ($\Phi_o$), the yield strength ($\psi$) may be related to the reaction force (F) and displacement ($\delta$) through a one-to-one correspondence, which may be described generally as: $\psi = f_3(\delta, F, \Phi_o)$.

Figure 3:
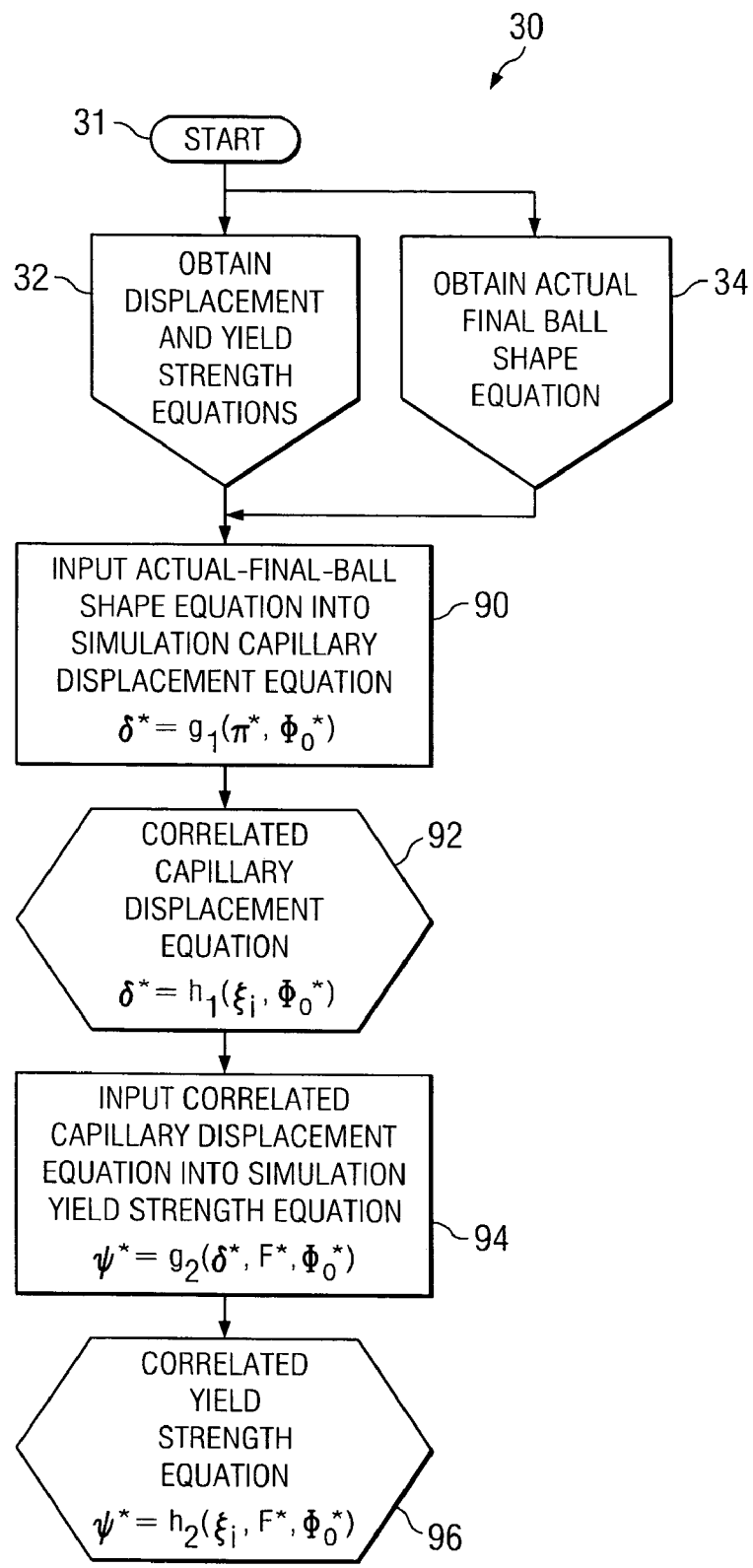
FIGS. 3–5 are flowcharts illustrating a first embodiment of the present invention for modeling a wire bonding process for a wire bonding machine.
Figure 4:
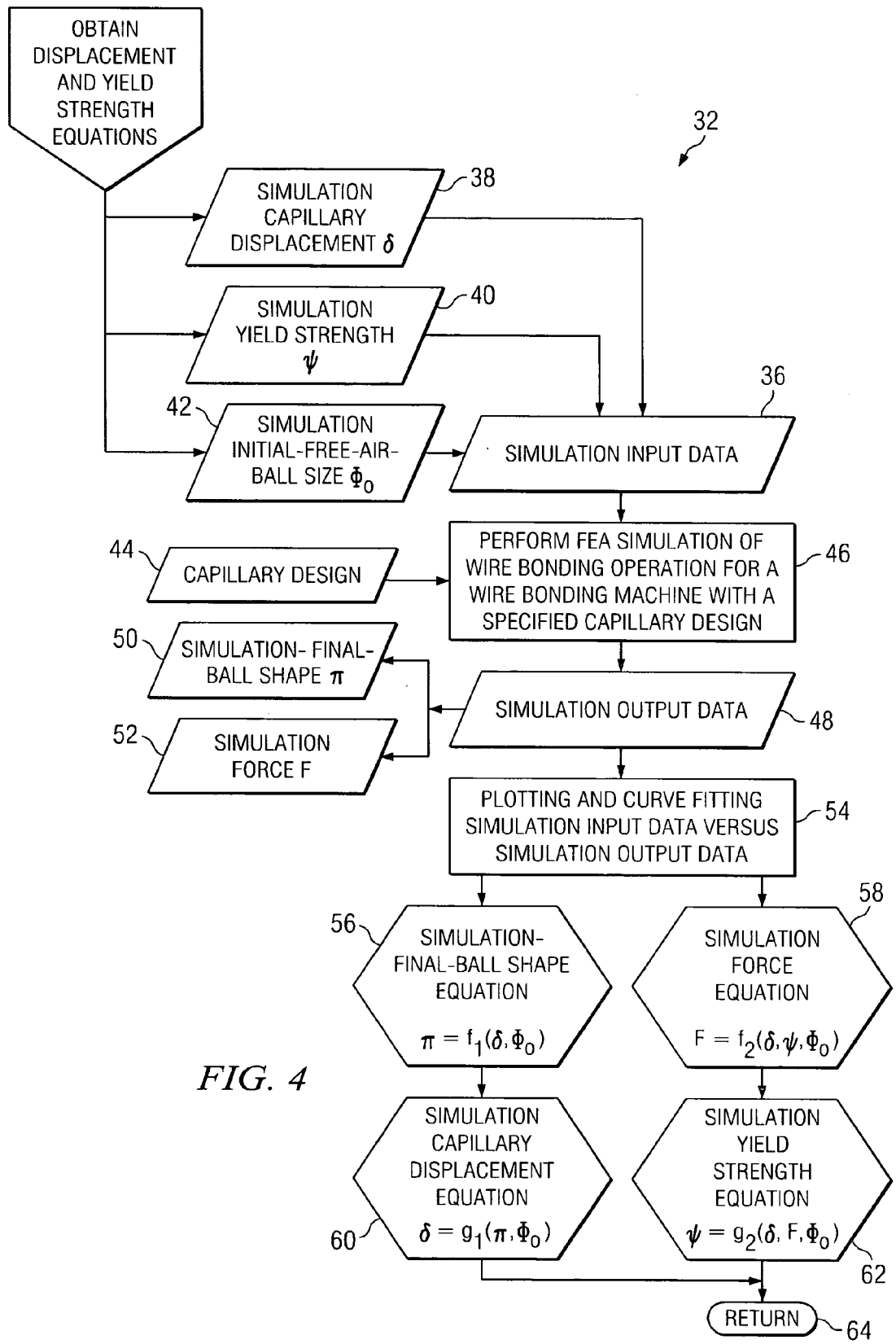
Figure 5:
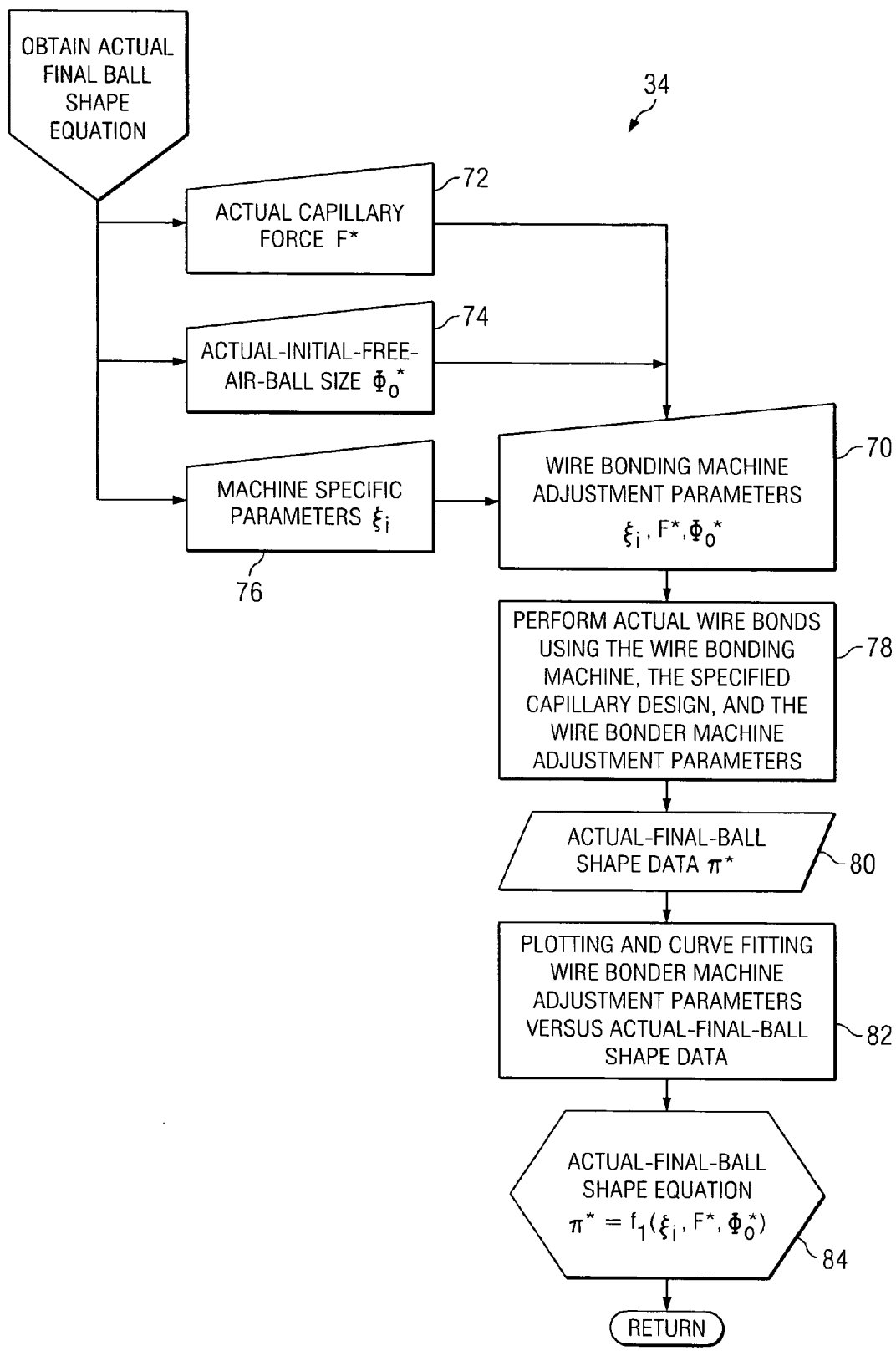
Figure 6:
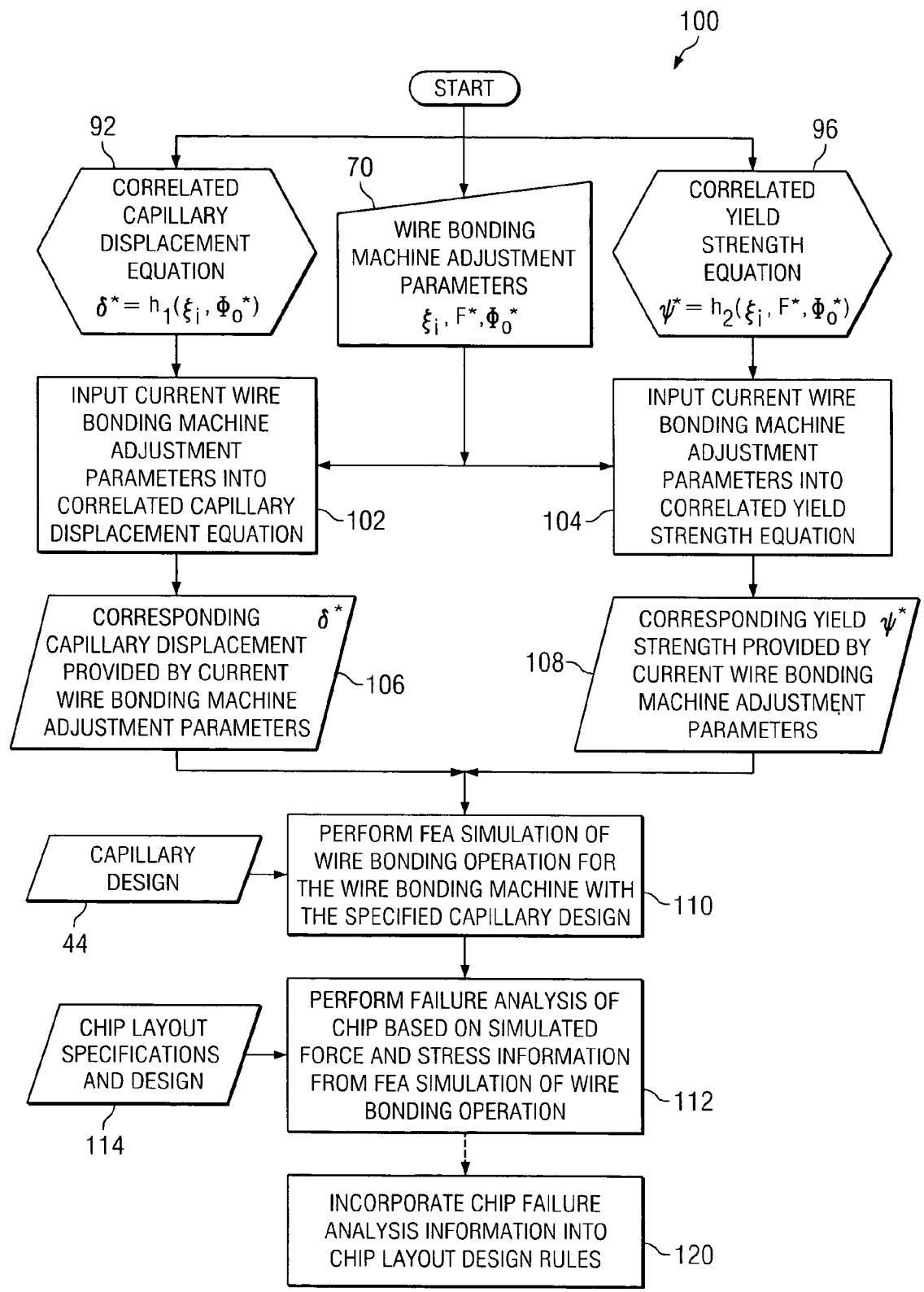
FIG. 6 is a flowchart illustrating an example use of the first embodiment.

FIGS. 3–5 are flowcharts illustrating a first embodiment of the present invention for modeling a wire bonding process for a wire bonding machine. FIG. 6 is a flowchart illustrating an example use of the first embodiment. Referring to FIG. 3, one of the goals of the first embodiment is to obtain empirical equations for capillary displacement ($\delta^*$) and wire yield strength ($\psi^*$) as a function of wire bonding machine adjustment parameters for the wire bonding machine. The terms "a wire bonding machine" and "the wire bonding machine" as used herein may refer to a certain make or model of wire bonding machine, or one particular wire bonding machine, for example. Assuming capillary displacement and wire yield strength are input parameters for an FEA model, such equations may allow FEA simulations to be performed for the wire bonding machine based on selected wire bonding machine adjustment parameters (see e.g., FIG. 6).

FIG. 3 illustrates a main process flow 30. FIGS. 4 and 5 illustrate subroutines 32, 34 called upon by the main process 30. Beginning in FIG. 3 at the start block 31 of the main process 30, the empirical equations for displacement, yield strength, and actual final ball shape are obtained (subroutine blocks 32 and 34). Either subroutine (32 or 34) may be performed first, or they may be performed in overlapping sequence or in parallel, for example. For purposes of discussion, FIG. 4 illustrating a process flow 32 for obtaining displacement and yield strength equations will be described first.

A goal of the process flow 32 shown in FIG. 4 is to obtain empirical equations for simulation capillary displacement ($\delta$) as a function of simulation-final-ball shape ($\pi$) and initial-free-ball-size ($\Phi_o$) (i.e., $\delta = g_1(\pi, \Phi_o)$, and simulation wire yield strength ($\psi$) as a function of simulation capillary displacement ($\delta$), simulation capillary reaction force (F), and initial-free-air-ball size ($\Phi_o$) (i.e., $\psi = g_2(\delta, \Phi_o)$. To obtain these equations, FEA simulations are performed numerous times for a specified capillary design (and/or for the wire bonding machine) while varying the inputs. This will generate sets of output data that may be plotted and correlated (empirically) to the sets of input data in various ways. In this example of FIG. 4 for the first embodiment, the simulation inputs varied are simulation capillary displacement ($\delta$), simulation wire yield strength ($\psi$), and simulation initial-free-air-ball size ($\Phi_o$). Thus, the simulation input data (data block 36) includes a set of simulation capillary displacement data ($\delta$) (data block 38), a set of simulation yield strength data ($\psi$) (data block 40), and a set of simulation initial-free-air-ball size data ($\Phi_o$) (data block 42).

The capillary design (data block 44) (see e.g., FIG. 1) is also a simulation input, and typically will be held constant for each set of empirical equations developed. In other words, a change in the capillary design (data block 44) may generate a different set of empirical equations, depending on the extent of changes between capillary designs. FEA simulations of a wire bonding operation for the wire bonding machine are performed numerous times to iterate through different permutations and/or combinations of the simulation input data, while keeping the capillary design fixed (see block 46). These iterations may be performed manually and/or using a software program, for example. The results of the FEA simulations (block 46) is simulation output data (data block 48), which includes sets of simulation final-ball shape data ($\pi$) (data block 50) and sets of simulation capillary reaction force data (F) (data block 52). Note that the simulation final-ball shape data ($\pi$) may include partially-squashed ball height data (h) and the partially-squashed ball diameter data ($\Phi$), for example.

One or more variables of the simulation input data may be plotted against one or more variables of the simulation output data (block 54). One or more relevant plots may be generated from such plotting. Such plotting may be initiated (and/or performed) manually and/or using a software program, for example. Preferably, such plotting is performed on a computer. The plotting may provide a visual display of the plot, but in some embodiments it may not. An empirical equation may be obtained from a curve provided on a plot using any of a variety of appropriate curve fitting functions, including (but not limited to): linear, quadratic, $n^{th}$-degree polynomial, logarithmic, or cubic spline, for example. Such curve fitting may be initiated (and/or performed) manually and/or by use of a software program, for example.

The curve fitting is preferably limited to providing an equation with a one-to-one correspondence between two key variables, as it may be needed or desirable to input one of the key variables (with or without other variables) and get only one answer for another key variable (rather than two or three). Such one-to-one correspondence may be one-way (e.g., one y value for every x value, but multiple x values for some or all y values) or may be two-way (e.g., one y value for every x value, and one x value for every y value), for example. The choice of variables in a plot may affect the ability to do so. For example, "$\Phi-\Phi_o$" may be plotted against "$\delta/\Phi_o$" to provide a curve that can provide a usable empirical equation (using a curve fitting function) for $\delta=g_1(\Phi, \Phi_o)$. Similarly, "$F/(\delta^2\Phi_o)$" may be plotted against "$\psi/(\delta\Phi_o)$" to provide a curve that can provide a usable empirical equation (using a curve fitting function) for $F=f_2(\delta, \psi, \Phi_o)$, for example.

In this example embodiment, an equation for simulation-final-ball shape is provided from a curve fitting, which may be represented generally as $\pi=f_1(\delta, \Phi_o)$ (see equation block 56 in FIG. 4). Also, an equation for simulation force is provided from a curve fitting, which may be represented generally as $F=f_2(\delta, \psi, \Phi_o)$ (see equation block 58). Assuming that there is a one-to-one correlation between simulation-final-ball shape ($\pi$) and simulation capillary displacement ($\delta$) in the simulation-final-ball shape equation, as is preferred, an empirical equation for simulation capillary displacement ($\delta$) may be solved for from the simulation-final-ball shape equation (see equation block 60). The simulation capillary displacement equation may be represented generally as $\delta=g_1(\pi, \Phi_o)$. Likewise, assuming that there is a one-to-one correlation between simulation force (F) and simulation yield strength ($\psi$) in the simulation force equation, as is preferred, an empirical equation for simulation yield strength ($\psi$) may be solved for from the simulation force equation (see equation block 62). The simulation yield strength equation may be represented generally as $\psi=g_2(\delta, F, \Phi_o)$. The solving of these equations may be performed manually and/or using a software program, for example.

In other embodiments, however, the simulation capillary displacement equation ($\delta=g_1(\pi, \Phi_o)$) and/or the simulation yield strength equation ($\psi=g_2(\delta, F, \Phi_o)$) may be determined or generated directly from the curve fitting, rather than via the simulation-final-ball shape equation ($\pi=f_1(\delta, \Phi_o)$, via the simulation force equation (F=$f_2(\delta, \psi, \Phi_o)$)), and/or via another equation, for example. After obtaining the empirical displacement and yield strength equations, return to the main process flow 30 in FIG. 3 (see return block 64 in FIG. 4).

Referring again to the main process flow 30 in FIG. 3, the subroutine 34 for obtaining an actual final ball shape equation will be described next. The process flow of this subroutine 34 is shown in FIG. 5. A goal of the process flow 34 shown in FIG. 5 is to obtain one or more empirical equations for actual-final-ball shape ($\pi^*$) as a function of wire bonding machine adjustment parameters. To obtain such equation(s), actual wire bonds are performed numerous times using the wire bonding machine while varying the wire bonding machine adjustment parameters. Such wire bonds are preferably performed using the same capillary design (see e.g., FIG. 1) that was used in the model for the FEA simulations (see e.g., data block 44 in FIG. 4). After performing these numerous wire bonds, the partially-squashed balls are measured to determine their shape ($\pi^*$), which may include partially-squashed ball height (h*) and partially-squashed ball diameter ($\Phi^*$), for example. This will generate sets of output data (i.e., $\pi^*$) that may be plotted and correlated (empirically) to the sets of input data (i.e., the wire bonding machine adjustment parameters). By using a curve fitting function, the empirical equation(s) for actual-final-ball shape ($\pi^*$) may be developed from the plot(s).

The wire bonding machine adjustment parameters (data block 70) may include actual capillary force (F*) (data block 72), actual-initial-free-air-ball size ($\Phi_o^*$) (data block 74), and other machine specific parameters ($\xi_i$) (data block 76), for example. Most wire bonding machines allow an operator to set the capillary force (F*) as one of the wire bonding machine adjustment parameters. Also, the actual-initial-free-air-ball size ($\Phi_o^*$) may be known and/or set as one of the wire bonding machine adjustment parameters on a typical wire bonding machine. The other machine specific parameters ($\xi_i$) may vary, depending on the make and/or model of the wire bonding machine, and may include (but not necessarily limited to): ultrasonic current, ultrasonic energy, scrub time, capillary velocity, or combinations thereof, for example. Preferably, the full range of all possible settings that a wire bonding machine operator may change for each wire bonding machine adjustment parameter is used and iterated through for performing the actual wire bond tests to provide the actual-final-ball shape data. However, only some or the most commonly used settings may be used to develop the actual-final-ball shape data. Also, it would be preferable (although not necessary) to perform multiple tests (e.g., great than about 30 times each) for each combination of wire bonding machine settings to provide a good statistical sampling for the actual-final-ball shape data.

After the actual wire bonds have been performed using the wire bonding machine (and using the same capillary design for example) (block 78) and the partially-squashed balls have been measured (and statistically analyzed if desired) to obtain the actual-final-ball shape data ($\pi^*$) (data block 80), the data is plotted. One or more variables of the wire bonding machine adjustment parameters may be plotted against one or more variables of the actual-final-ball shape data (block 82). One or more relevant plots may be generated from such plotting. Such plotting may be initiated (and/or performed) manually and/or using a software program, for example. Preferably, such plotting is performed on a computer. The plotting may provide a visual display of the plot, but in some embodiments it may not. An empirical equation may be obtained from a curve provided on a plot using any of a variety of appropriate curve fitting functions, including (but not limited to): linear, quadratic, $n^{th}$-degree polynomial, logarithmic, or cubic spline, for example. Such curve fitting may be initiated (and/or performed) manually and/or by use of a software program, for example.

The curve fitting is preferably limited to providing an equation with a one-to-one correspondence between two key variables, as it may be needed or desirable to input one of the key variables (with or without other variables) and get only one answer for another key variable (rather than two or three). Such one-to-one correspondence may be one-way (e.g., one y value for every x value, but multiple x values for some or all y values) or may be two-way (e.g., one y value for every x value, and one x value for every y value), for example. The choice of variables in a plot may affect the ability to do so. In this example embodiment, one or more equations for actual-final-ball shape ($\pi^*$) (e.g., equation(s) for $h^*$ and/or $\Phi^*$) are provided from curve fitting(s), which may be represented generally as $\pi^*=f_1(\xi_i, F^*, \Phi_o^*)$ (see equation block 84 in FIG. 5).

Note that the equation for simulation-final-ball shape ($\pi$) in FIG. 4 (equation block 56) is a function of different variables than the equation for actual-final-ball shape ($\pi^*$) in FIG. 5 (equation block 84). However, note that the equation for simulation capillary displacement ($\delta$) in FIG. 4 (equation block 60), which may be derived from the simulation-final-ball shape equation of FIG. 4, is a function of final ball shape ($\pi$). Thus, the final ball shape variable(s) ($\pi$) in the simulation capillary displacement equation ($\delta=g_1(\pi, \Phi_o)$) (equation block 60 in FIG. 4) may be used to correlate the wire bonding machine adjustment parameters (data block 70 in FIG. 5) to the simulation input data (data block 36 in FIG. 4).

Returning again to the main process flow 30 of FIG. 3, the actual-final-ball shape equation(s) ($\pi^*=f_1(\xi_i, F^*, \Phi_o^*)$) is/are input into the simulation capillary displacement equation(s) ($\delta=g_1(\pi, \Phi_o)$ (see block 90 in FIG. 3) to correlate the actual and simulation equations, which may be represented generally as: $\delta^*=g_1(\pi^*, \Phi_o^*)$. Doing so should provide a correlated capillary displacement equation, which may be represented generally as: $\delta^*=h_1(\xi_i, \Phi_o^*)$ (equation block 92 in FIG. 3).

Then, the correlated capillary displacement equation ($\delta^*=h_1(\xi_i, \Phi_o^*)$) may be input into the simulation yield strength equation ($\psi=g_2(\delta, F, \Phi_o)$ for FIG. 4, (see equation block 92) to correlate the actual and simulation equations, which may be represented generally as: $\psi^*=g_2(\delta^*, F^*, \Phi_o^*)$ (see block 94 in FIG. 3). Doing so should provide a correlated yield strength equation, which may be represented generally as: $\psi^*=h_2(\xi_i, F^*, \Phi_o^*)$ (equation block 96 in FIG. 3). Therefore, the capillary displacement ($\delta$) and the yield strength ($\psi$) needed for performing an FEA simulation may be determined from the empirical equations developed in accordance with the first embodiment of the present invention based upon wire bonding machine adjustment parameters (e.g., $\xi_i, F^*, \Phi_o^*$) for the wire bonding machine and for the specified capillary design.

FIG. 6 is a flowchart 100 that illustrates a useful application of the correlated capillary displacement ($\delta^*$) and yield strength ($\psi^*$) equations, in which an FEA simulation is performed based upon a chosen set of wire bonding machine adjustment parameters. Hence, the use illustrated in FIG. 6 assumes that the steps outlined in FIGS. 3–5 have been performed for a given capillary design and a wire bonding machine to develop the correlated capillary displacement ($\delta^*$) and yield strength ($\psi^*$) equations (see equations blocks 92 and 96 in FIG. 6).

The following discussion describes just one possible application, among others, in which the first embodiment of the present invention may be used. With the benefit of this disclosure, one of ordinary skill in the art will likely realize other possible uses and applications of the first embodiment and/or other embodiments of the present invention. Thus, referring to FIG. 6, a set of wire bonding machine adjustment parameters are chosen or selected by a user (manually and/or using a software program, for example) (see input data block 70 in FIG. 6). The current or chosen wire bonding machine adjustment parameters are input into the correlated capillary displacement equation (block 102) and into the correlated yield strength equation (block 104). The output from doing so will be a capillary displacement value ($\delta^*$) (output data block 106) and a yield strength value ($\psi^*$) (output data block 108), each corresponding to the current/chosen wire bonding machine adjustment parameters. These steps of providing these values may be performed sequentially (in any order), in parallel, or in overlapping sequence, for example. Also, these steps of providing these values may be performed manually and/or using a software program, for example.

With the corresponding capillary displacement value ($\delta^*$) and the corresponding yield strength value ($\psi^*$), an FEA simulation of a wire bonding operation/process may be performed for the wire bonding machine with the specified capillary design (block 110). Such FEA simulation provides output information, such as (but not necessarily limited to) simulated reaction force on capillary, force exerted on bond pad and/or chip, and/or final partially-squashed ball shape, for example. As part of the same FEA analysis or as obtained from a separate analysis, a failure analysis of the chip or some component(s) of the chip (e.g., low-k layer(s) under bond pads) may be performed based on the simulated force, stress, and/or strain information from the FEA simulation of the wire bonding operation (block 112). Such analysis may require the incorporation of the chip layout specifications and design as an input (input data block 114), for example. Thus, a failure analysis of a proposed or current chip assembly process may be performed based on the chip design and based on a proposed or current set of wire bonding machine adjustment parameters.

As an optional extension of the chip failure analysis illustrated in FIG. 6, information and results of such analysis may be incorporated into one or more chip layout design rules (optional block 120 in FIG. 6). As another example use, a series of FEA simulations and/or chip failure analysis studies may be performed using different values of the wire bonding machine adjustment parameters (e.g., iterating through some or all combinations of values for these parameters) to provide information that may be incorporated into chip layout design rules and/or other design rules, for example. As yet another example use, a series of FEA simulations and/or chip failure analysis studies may be performed using different values of the wire bonding machine adjustment parameters (e.g., iterating through some or all combinations of values for these parameters) to provide information about ranges and/or combinations of wire bonding machine adjustment parameters that may provide wire bonding within certain limits of stress on the chip, for example. With the benefit of this disclosure, one of ordinary skill in the art will likely realize many other useful applications and/or variations for an embodiment of the present invention.

Although embodiments of the present invention and at least some of its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of analyzing wire bonding operations for a specified capillary design of a wire bonding machine, comprising:
   performing multiple finite element analysis simulations modeling an actual wire bonding operation of the specified capillary design with a range of simulation inputs;
   developing first empirical equations relating to the inputs simulations based on simulation outputs from the multiple finite element analysis simulations;
   performing multiple actual wire bonding operations using the specified capillary design over ranges of actual wire bonding machine adjustment parameters;
   developing second empirical equations relating to the actual wire bonding machine adjustment parameters based on results of the multiple actual wire bonding operations; and
   combining the first and second empirical equations to provide correlated empirical equations for the simulation inputs as functions of at least some of the actual wire bonding machine adjustment parameters.

2. The method of claim 1, further comprising:
   selecting an analysis set of values for the actual wire bonding machine adjustment parameters;
   inputting the analysis set of values into at least one of the correlated empirical equations to calculate analysis simulation inputs;
   developing a finite element model of a portion of a chip; and
   performing a finite element analysis simulation modeling the actual wire bonding operation on the chip portion using the specified capillary design with the analysis simulation inputs to provide analysis simulation outputs, wherein the analysis simulation outputs provide information regarding whether the chip portion was damaged by the wire bonding operation at the selected analysis set of values for the actual wire bonding machine adjustment parameters.

3. The method of claim 1, further comprising:
   selecting an analysis set of values for the actual wire bonding machine adjustment parameters;
   inputting the analysis set of values into at least one of the correlated empirical equations to calculate analysis simulation inputs;
   performing a finite element analysis simulation modeling the actual wire bonding operation using the specified capillary design with the analysis simulation inputs to provide analysis simulation outputs;
   developing a finite element model of a portion of a chip; and
   using the simulation outputs while analyzing whether the chip portion may be damaged by the wire bonding operation at the selected analysis set of values for the actual wire bonding machine adjustment parameters.

4. The method of claim 1, further comprising:
   selecting ranges of values for the actual wire bonding machine adjustment parameters;
   inputting the ranges of values for the actual wire bonding machine adjustment parameters into at least one of the correlated empirical equations to provide ranges of analysis simulation inputs;
   developing a finite element model of a portion of a chip; and
   performing multiple finite element analysis simulations modeling the actual wire bonding operation on the chip portion using the specified capillary design over the ranges of analysis simulation inputs to provide ranges of analysis simulation outputs, wherein the ranges of analysis simulation outputs provide information regarding whether the chip portion was damaged by the wire bonding operation at certain values in the selected ranges of values for the actual wire bonding machine adjustment parameters.

5. The method of 4, further comprising:
   inputting information regarding the ranges of analysis simulation outputs into a chip design rule, wherein the inputted information relates to noting values of the actual wire bonding machine adjustment parameters that will likely cause damage to the chip portion.

6. A method of correlating actual wire bonding machine adjustment parameters to inputs needed for simulating wire bonding operations for a specified capillary design of a wire bonding machine, comprising:
   performing multiple finite element analysis simulations of wire bonding operations using a model of the specified capillary design for the wire bonding machine and iterating through various combinations of a first set of simulation inputs;
   obtaining empirical equations for simulation capillary displacement and simulation yield strength based on results of the simulations, wherein the simulation results include simulation-final-ball shape data, wherein the empirical equation for simulation capillary displacement is a function of simulation-final-ball shape, and wherein the empirical equation for simulation yield strength is a function of simulation capillary displacement;
   performing multiple actual wire bonding operations using the specified capillary design and the wire bonding machine and iterating through various combinations of at least some of the actual wire bonding machine adjustment parameters;
   obtaining an empirical equation for actual-final-ball shape based on results of the actual wire bonding operations, wherein the empirical equation for actual-final-ball shape is a function of at least one of the actual wire bonding machine adjustment parameters;

inputting the empirical equation for actual-final-ball shape into the empirical equation for simulation capillary displacement to obtain a correlated empirical equation for simulation capillary displacement as a function of at least one of the actual wire bonding machine adjustment parameters;

inputting the correlated empirical equation for simulation capillary displacement into the empirical equation for simulation yield strength to obtain a correlated empirical equation for simulation yield strength as a function of at least one of the actual wire bonding machine adjustment parameters.

7. The method of claim 6, wherein the first set of simulation inputs comprises at least one simulation capillary displacement value, at least one simulation wire material yield strength value, and at least one simulation-initial-free-air-ball size value.

8. The method of claim 6, wherein the simulation results comprise simulation force data.

9. The method of claim 6, wherein the obtaining the empirical equations for simulation capillary displacement and simulation yield strength comprises plotting and curve fitting at least one parameter of the simulation inputs versus at least one parameter of the simulation results.

10. The method of claim 6, wherein the obtaining the empirical equation for actual-final-ball shape comprises plotting and curve fitting at least one parameter of the actual wire bonding machine adjustment parameters versus measurement data for actual-final-ball shape.

11. A method of modeling a wire bonding process for a wire bonding machine, comprising:

performing a first set of simulations with a first set of input data for a specified design of a capillary for the wire bonding machine using a finite element analysis of the wire bonding machine in simulated operation, wherein the first set of input data comprises at least one simulation capillary displacement value, at least one simulation wire material yield strength value, and at least one simulation-initial-free-air-ball size value;

from the first set of simulations, obtaining a first set of output data, wherein the first set of output data comprises at least one simulation-final-ball shape value and at least one simulation force value, wherein simulation force corresponds to a reaction force on the capillary;

plotting and curve fitting at least one parameter of the first set of input data versus at least one parameter of the first set of output data;

obtaining an equation for simulation capillary displacement as a function of simulation-final-ball shape and simulation-initial-free-air-ball size based on the curve fitting of at least one parameter of the first set of input data versus at least one parameter of the first set of output data;

obtaining an equation for simulation yield strength as a function of simulation capillary displacement, simulation force, and simulation-initial-free-air-ball size based on the curve fitting of at least one parameter of the first set of input data versus at least one parameter of the first set of output data;

performing a first set of actual wire bonds using the wire bonding machine, the specified capillary design, and a first set of wire bonding machine adjustment parameters, wherein the first set of wire bonding machine adjustment parameters comprises at least one actual-initial-free-air-ball size value, at least one actual capillary force value, and at least one machine-specific parameter value;

from the first set of actual wire bonds, obtaining a set of actual-final-ball shape data;

plotting and curve fitting at least one parameter of the first set of wire bonding machine adjustment parameters versus at least part of the actual-final-ball shape data;

obtaining an equation for actual-final-ball shape as a function of the at least one parameter of the first set of wire bonding machine adjustment parameters;

inputting the actual-final-ball shape equation into the simulation capillary displacement equation to obtain a correlated capillary displacement equation as a function of the at least one parameter of the first set of wire bonding machine adjustment parameters, such that a correlated capillary displacement value may be calculated from the correlated capillary displacement equation using the at least one parameter of the first set of wire bonding machine adjustment parameters; and inputting the correlated capillary displacement equation into the simulation yield strength equation to obtain a correlated yield strength equation as a function of the at least one parameter of the first set of wire bonding machine adjustment parameters, such that a correlated yield strength value may be calculated from the correlated yield strength equation using the at least one parameter of the first set of wire bonding machine adjustment parameters.

12. The method of claim 11, further comprising:

obtaining an equation for simulation-final-ball shape as a function of simulation capillary displacement and simulation-initial-free-air-ball size based on the curve fitting of at least one parameter of the first set of input data versus at least one parameter of the first set of output data, wherein the simulation capillary displacement equation is obtained by solving the simulation-final-ball shape equation for simulation capillary displacement.

13. The method of claim 12, wherein the curve fitting for providing the simulation-final-ball shape equation yields a one-to-one correspondence between simulation-final-ball shape and simulation capillary displacement.

14. The method of claim 11, further comprising:

obtaining an equation for simulation force as a function of simulation capillary displacement, simulation yield strength, and simulation-initial-free-air-ball size based on the curve fitting of at least one parameter of the first set of input data versus at least one parameter of the first set of output data, wherein the simulation yield strength equation is obtained by solving the simulation force equation for simulation yield strength.

15. The method of claim 14, wherein the curve fitting for providing the simulation force equation yields a one-to-one correspondence between simulation force and simulation yield strength.

16. A method of performing a failure analysis on a chip, comprising:

performing multiple finite element analysis simulations of wire bonding operations using a model of the specified capillary design for the wire bonding machine and iterating through various combinations of a first set of simulation inputs;

obtaining empirical equations for simulation capillary displacement and simulation yield strength based on results of the simulations, wherein the results include simulation-final-ball shape data, wherein the empirical equation for simulation capillary displacement is a function of simulation-final-ball shape, and wherein the empirical equation for simulation yield strength is a function of simulation capillary displacement;

performing multiple actual wire bonding operations using the specified capillary design and the wire bonding machine and iterating through various combinations of at least some of the actual wire bonding machine adjustment parameters;

obtaining an empirical equation for actual-final-ball shape based on results of the actual wire bonding operations, wherein the empirical equation for actual-final-ball shape is a function of at least one of the actual wire bonding machine adjustment parameters;

inputting the empirical equation for actual-final-ball shape into the empirical equation for simulation capillary displacement to obtain a correlated empirical equation for simulation capillary displacement as a function of at least one of the actual wire bonding machine adjustment parameters;

inputting the correlated empirical equation for simulation capillary displacement into the empirical equation for simulation yield strength to obtain a correlated empirical equation for simulation yield strength as a function of at least one of the actual wire bonding machine adjustment parameters;

selecting an analysis input data set from the actual wire bonding machine adjustment parameters;

inputting the analysis input data set into the correlated empirical equation for simulation capillary displacement to obtain an analysis value for simulation capillary displacement;

inputting the analysis input data set into the correlated empirical equation for simulation yield strength to obtain an analysis value for simulation yield strength;

inputting design specifications for at least part of a chip;

performing a finite element analysis simulation of a wire bonding operation using a model of the specified capillary design for the wire bonding machine; and analyzing the simulated effect of the simulated wire bonding operation on the chip.

17. The method of claim 16, wherein the first set of simulation inputs comprises at least one simulation capillary displacement value, at least one simulation wire material yield strength value, and at least one simulation-initial-free-air-ball size value.

18. The method of claim 16, wherein the simulation results comprise simulation force data.

19. The method of claim 16, wherein the obtaining the empirical equations for simulation capillary displacement and simulation yield strength comprises plotting and curve fitting at least one parameter of the simulation inputs versus at least one parameter of the simulation results.

20. The method of claim 16, wherein the obtaining the empirical equation for actual-final-ball shape comprises plotting and curve fitting at least one parameter of the actual wire bonding machine adjustment parameters versus measurement data for actual-final-ball shape.

* * * * *